United States Patent
Lim et al.

(10) Patent No.: US 10,254,913 B2
(45) Date of Patent: Apr. 9, 2019

(54) SELECTION EDITING USING A LOCALIZED LEVEL SET ALGORITHM

(71) Applicant: Adobe Inc., San Jose, CA (US)

(72) Inventors: JaeGwang Lim, Seoul (KR); Byungmoon Kim, Sunnyvale, CA (US); Sunil Hadap, Newark, CA (US)

(73) Assignee: Adobe Inc., San Jose, CA (US)

( * ) Notice: Subject to any disclaimer, the term of this patent is extended or adjusted under 35 U.S.C. 154(b) by 190 days.

(21) Appl. No.: 15/378,218

(22) Filed: Dec. 14, 2016

(65) Prior Publication Data

US 2017/0090715 A1 Mar. 30, 2017

Related U.S. Application Data

(63) Continuation of application No. 13/789,975, filed on Mar. 8, 2013, now Pat. No. 9,547,410.

(51) Int. Cl.
| | |
|---|---|
| *G06F 3/048* | (2013.01) |
| *G06F 3/0481* | (2013.01) |
| *G06T 7/13* | (2017.01) |
| *G06F 3/0484* | (2013.01) |
| *G06F 3/01* | (2006.01) |

(52) U.S. Cl.
CPC ...... *G06F 3/04812* (2013.01); *G06F 3/04842* (2013.01); *G06F 3/04845* (2013.01); *G06T 7/13* (2017.01); *G06F 2203/04805* (2013.01); *G06T 2207/20104* (2013.01)

(58) Field of Classification Search
CPC ............. G06F 3/04812; G06F 3/04842; G06F 3/04845; G06T 7/13
See application file for complete search history.

(56) References Cited

U.S. PATENT DOCUMENTS

| | | | |
|---|---|---|---|
| 4,908,698 A | 3/1990 | Enomoto | |
| 5,544,263 A | 8/1996 | Iwamura | |
| 6,665,439 B1 | 12/2003 | Takahashi | |
| 6,697,497 B1 | 2/2004 | Jensen | |

(Continued)

OTHER PUBLICATIONS

J.A. Sethian, "Level Set Methods and Fast Marching Methods", Cambridge University Press, pp. 73-74 (1999).

(Continued)

*Primary Examiner* — Nicholas Augustine
(74) *Attorney, Agent, or Firm* — Finch & Maloney PLLC

(57) ABSTRACT

Techniques are disclosed for selecting a targeted portion of a digital image. In one embodiment, a selection cursor having central and peripheral regions is provided. The central region is used to force a selection or a deselection, and therefore moving the central region over a portion of the image causes that portion of the image to be selected or deselected, respectively. The peripheral region of the cursor surrounds the central region and defines an area where a localized level set algorithm for boundary detection is performed. This provides more accurate boundary detection within the narrowly-focused peripheral region and eliminates the need to apply the level set algorithm across the entire image. Thus moving the peripheral region of the selection cursor over a boundary of the targeted portion of the image applies the level set algorithm in that boundary region and increases the likelihood that the boundary will be detected accurately.

20 Claims, 12 Drawing Sheets

(56) References Cited

U.S. PATENT DOCUMENTS

| | | | |
|---|---|---|---|
| 7,277,582 B2 | 10/2007 | Paragios | |
| 7,813,822 B1* | 10/2010 | Hoffberg | G06K 9/00369 |
| | | | 381/73.1 |
| 7,907,793 B1* | 3/2011 | Sandrew | H04N 9/43 |
| | | | 348/576 |
| 8,155,391 B1* | 4/2012 | Tang | G06K 9/00651 |
| | | | 382/113 |
| 8,175,409 B1 | 5/2012 | Wilensky | |
| 8,432,392 B2 | 4/2013 | Kim | |
| 8,737,730 B2 | 5/2014 | Sloan | |
| 9,355,457 B1 | 5/2016 | Kim | |
| 2002/0118875 A1 | 8/2002 | Wilensky | |
| 2004/0220965 A1* | 11/2004 | Harville | G06F 17/30017 |
| 2005/0025359 A1* | 2/2005 | Priddy | G06T 11/60 |
| | | | 382/173 |
| 2006/0053374 A1 | 3/2006 | Wilensky | |
| 2006/0155398 A1* | 7/2006 | Hoffberg | G05B 15/02 |
| | | | 700/86 |
| 2008/0019587 A1 | 1/2008 | Wilensky | |
| 2008/0122858 A1 | 5/2008 | Wilensky | |
| 2008/0131010 A1 | 6/2008 | Wilensky | |
| 2008/0263012 A1* | 10/2008 | Jones | G06F 17/30811 |
| 2012/0063681 A1* | 3/2012 | Sandrew | G06T 11/001 |
| | | | 382/167 |

OTHER PUBLICATIONS

Stanley Osher, et al., "Level Set Methods and Dynamic Implicit Surfaces", Springer-Verlag, pp. 3-39, 119-134 (2003).

Zhang Junru, et al.,"Research on Edge Extraction with Level Set Method", The International Archives of the Photogrammetry, Remote Sensing and Spatial Information Sciences, vol. XXXVII, Part B4, pp. 433-438.

\* cited by examiner

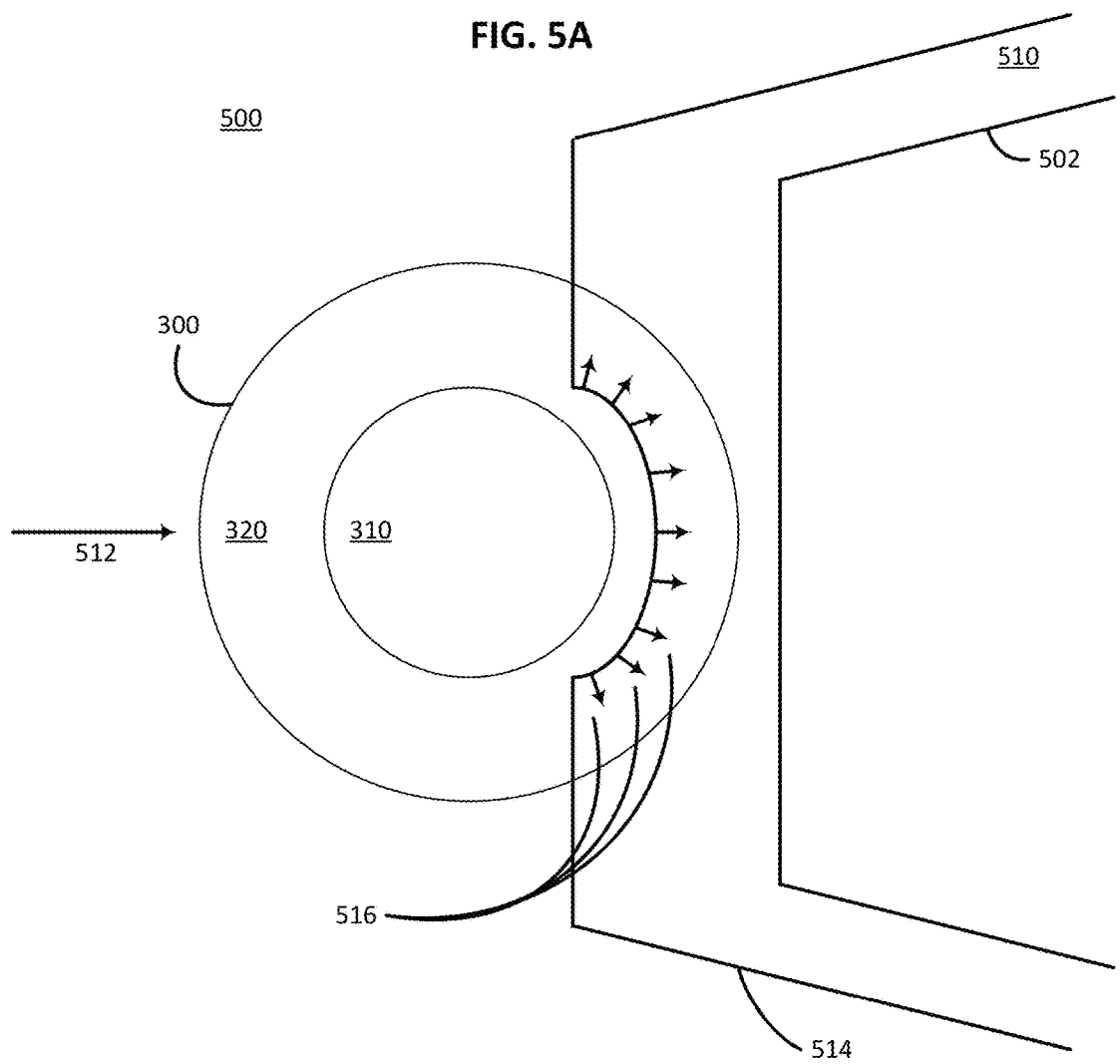

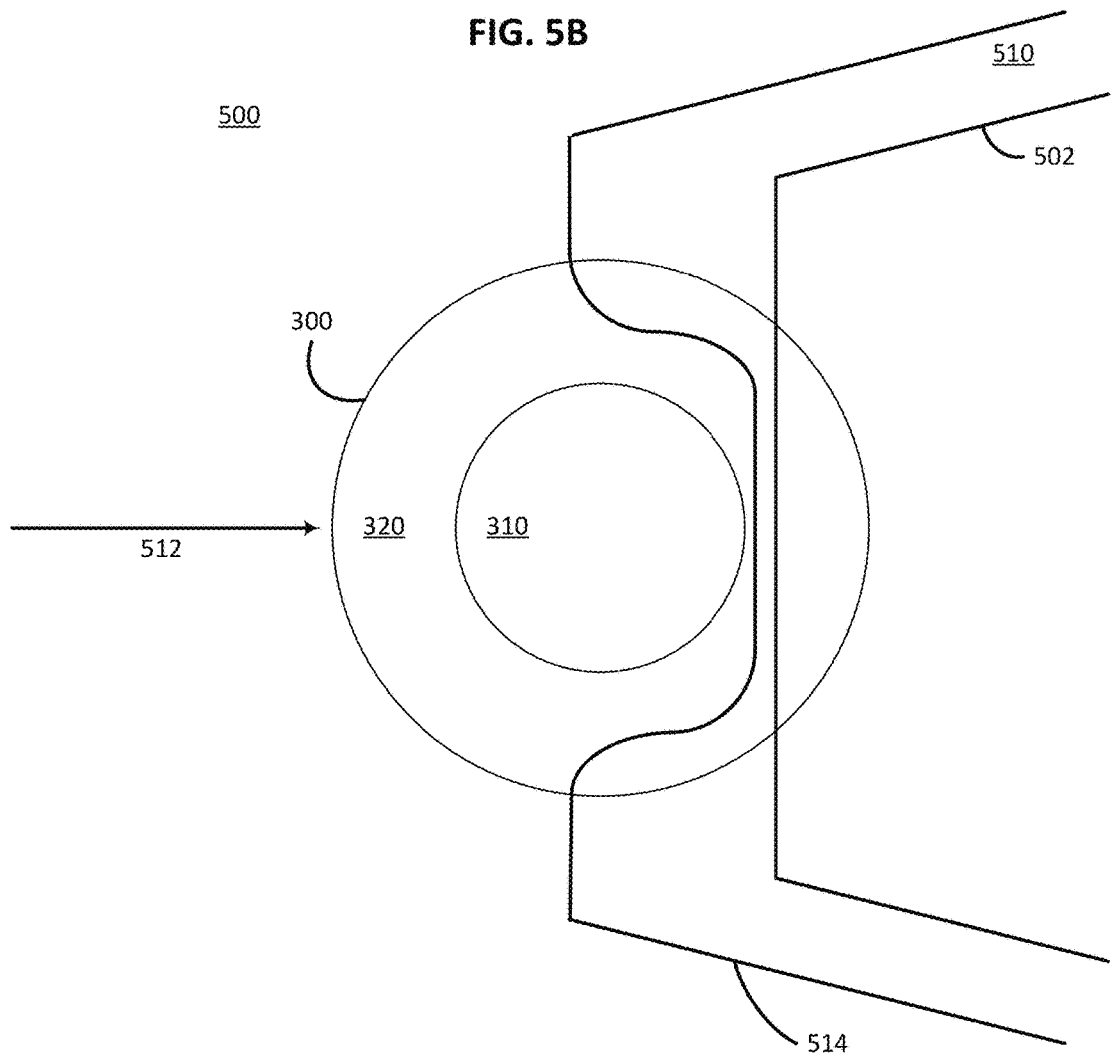

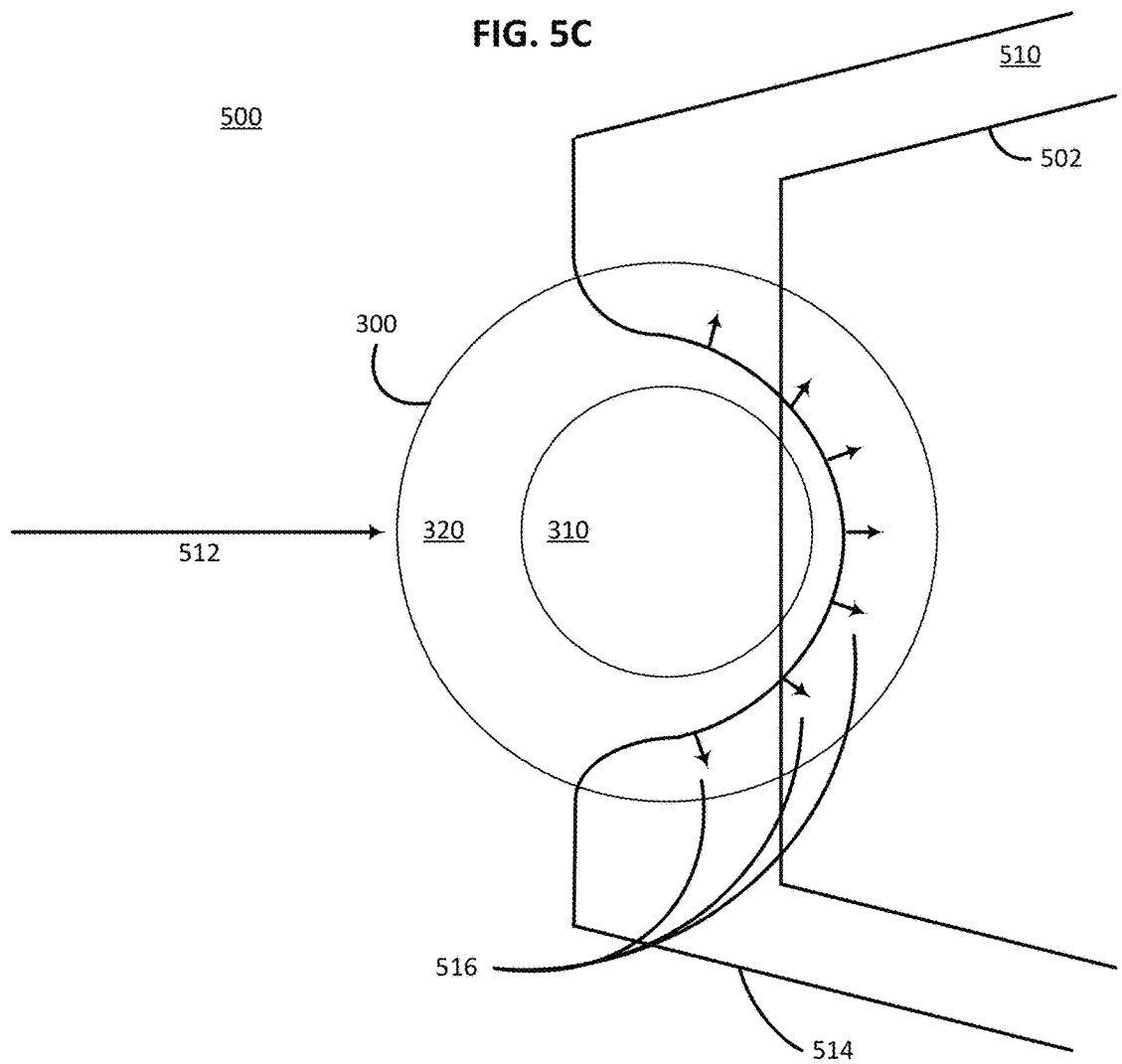

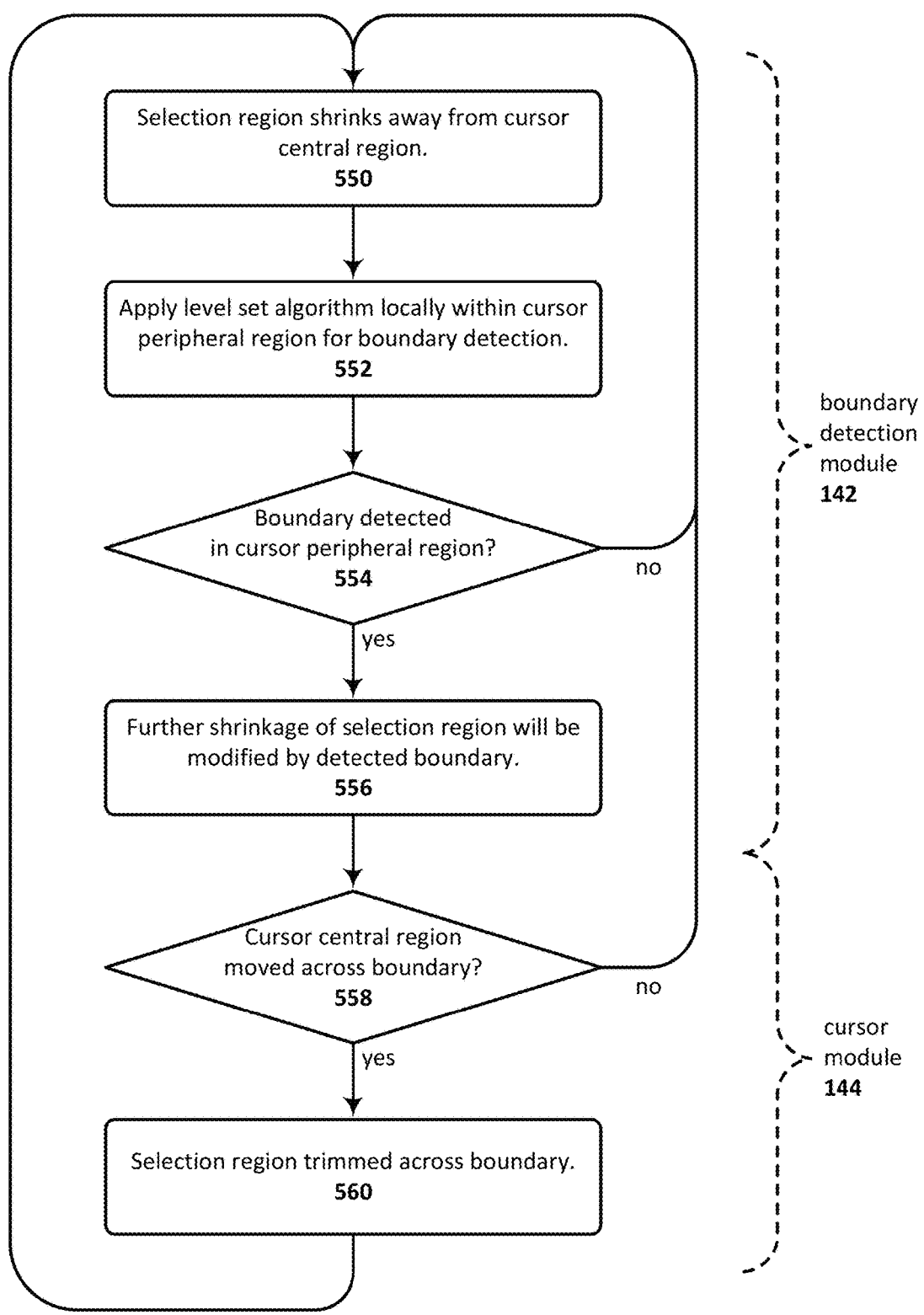

SELECTION EDITING USING A LOCALIZED LEVEL SET ALGORITHM

CROSS-REFERENCE TO RELATED APPLICATION

This application is a continuation of U.S. patent application Ser. No. 13/789,975 (filed 8 Mar. 2013), the entire disclosure of which is hereby incorporated by reference herein.

FIELD OF THE DISCLOSURE

This disclosure relates generally to digital image processing, and more specifically to techniques for selecting portions of a digital image using a level set algorithm.

BACKGROUND

A wide variety of software tools have been developed to facilitate the process of manipulating different types of digital data. For example, image editing software applications have been developed to adjust, modify and otherwise manipulate digital images. Such software applications generally allow a user to make global manipulations to an entire image as well as localized manipulations that affect only a selected portion of an image. Making localized manipulations generally comprises a two-step process of first selecting a portion of the image that is to be manipulated and then applying the desired manipulation to that selection. Such image editing software applications also often allow a user to copy and/or extract a selected portion of an image, which also involves making an initial selection of the portion of the image to be copied and/or extracted. There remain, however, a number of non-trivial limitations with such existing editing applications.

BRIEF DESCRIPTION OF THE DRAWINGS

FIGS. 5A-5C schematically illustrate a second example methodology of modifying an existing selection region using a selection cursor configured in accordance with an embodiment of the present invention.

FIG. 5D is a flowchart illustrating an example technique for using a negative polarity selection cursor to modify an existing selection region in accordance with an embodiment of the present invention.

DETAILED DESCRIPTION

Figure 1A:
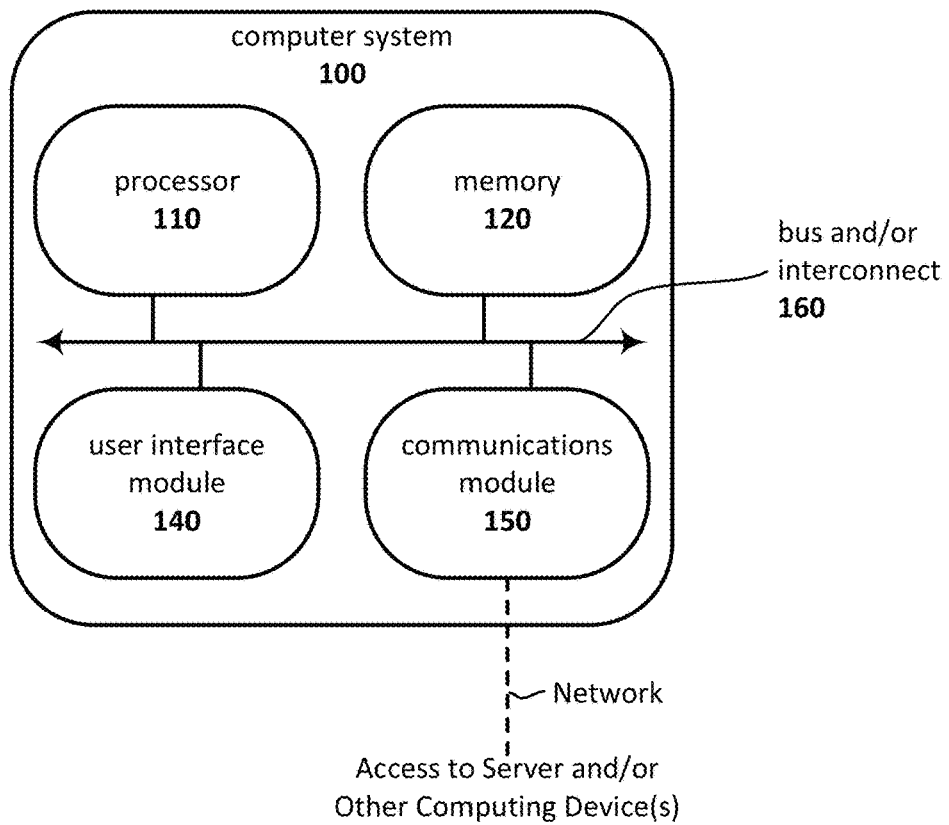
FIG. 1A is a block diagram schematically illustrating selected components of a computer system that can be used to implement certain embodiments of the present invention.

Techniques are disclosed for facilitating the process of selecting a targeted portion of a digital image using an image editing software application. In one embodiment, a selection cursor having an interior region and a peripheral region is provided. The interior region is used to force a selection or a deselection, and therefore moving the interior region over a portion of the image causes that portion of the image to be selected or deselected, respectively. The peripheral region of the cursor surrounds the interior region and defines an area where a localized level set algorithm for boundary detection is performed. This provides more accurate boundary detection within the narrowly-focused peripheral region and eliminates the need to apply the level set algorithm across the entire image. Thus moving the peripheral region of the selection cursor over a boundary of the targeted portion of the image causes the level set algorithm to be applied in that boundary region and increases the likelihood that the boundary will be detected accurately. In certain embodiments, the user is provided with near real-time feedback, such as visual feedback, regarding the results of the selection. Once the targeted region has been selected, the user may, for example, apply a localized adjustment to the targeted region, copy the targeted region, or extract the targeted region from the rest of the image, in accordance with some embodiments. Numerous configurations and variations of such techniques will be apparent in light of this disclosure.

A. General Overview

As set forth above, image editing software applications are often used to adjust, modify and otherwise manipulate digital images. One example of such an application is ADOBE® PHOTOSHOP®, developed by Adobe Systems Incorporated of San Jose, Calif. Software such as this allows users to make localized adjustments to a selected portion of an image, copy selected portions of an image, or extract selected portions of an image. These operations can be useful, for example, if a user wishes to adjust the brightness of a person's face or change the color hue of a flower without altering the remainder of the image. Such operations can also be used to extract one or more foreground objects from a background scene. A wide variety of other image processing operations can be used as well. However, regardless of the particular type of image processing which is to be performed, localized operations generally involve first creating a "selection mask" which defines that portion of the image that is to be adjusted, copied or extracted. After the selection mask is defined, the desired operation is then applied to the portion of the image within the selection mask.

Existing techniques for defining a selection mask tend to suffer from a number of deficiencies. For example, automated techniques have a difficult time reliably detecting boundaries within an image, and therefore often inaccurately include unwanted regions within the selection mask or exclude targeted regions from the selection mask. Partially automated and manual selection techniques may provide greater accuracy but generally require time consuming user input. In either case, it can be difficult to edit a previously defined selection mask. Examples of current selection tools include the "Magic Wand", "Quick Selection" and "Magnetic Lasso" tools, all of which are available using ADOBE® PHOTOSHOP®. The Magic Wand and Quick Selection tools analyze user-specified points or regions to compute a region of selected pixels, such that all of the selected pixels fall within some adjustable tolerance of the color and/or texture statistics of the user-specified region. However, determining an acceptable tolerance can be difficult because the distribution of color and/or texture space between the selected and unselected pixels may have considerable overlap. The Magnetic Lasso tool uses boundary or contrast information to find an optimal boundary between two regions. While this allows a user to trace an object's boundary with a mouse, this can often be a tedious process that requires many user interactions to achieve a satisfactory result, especially when applied to highly textured areas.

Thus, and in accordance with an embodiment of the claimed invention, techniques are provided herein that facilitate the process of defining a selection mask for a digital image using a selection cursor. The selection cursor can be used, for example, in the context of a graphical user interface provided by an image editing software application, in which case the cursor can be controlled by any of a wide variety of user interface methods, including for example, a mouse, a touchpad, a joystick, a touchscreen or any other suitable pointing implement. The techniques disclosed herein can be applied to a wide variety of digital images made of image pixels, such as non-vector-based graphics. In certain embodiments the user is further provided with the ability to interactively modify the selection region after it has been initially defined. Once the selection mask has been defined to the user's satisfaction, any of a broad range of image adjustment operations can be applied to the selection, including operations such as brightness adjustment, contrast adjustment, color hue adjustment, copy and extract.

The various embodiments disclosed herein can be implemented in various forms of hardware, software, firmware and/or special purpose processors. For example, in one embodiment a non-transient computer readable medium has instructions encoded thereon that, when executed by one or more processors, cause one or more of the various selection methodologies disclosed herein to be implemented. Such a computer readable medium can be provided in the form of a computer software application that is tangibly embodied on a memory device, and that can be executed by a computer having any suitable architecture. In certain embodiments the computer software application is specifically designed for the manipulation of digital images, although in other embodiments the functionalities disclosed herein can be incorporated into other software applications, such as video editing applications, audio processing applications or document processing applications. The computer software application may include a number of different modules, sub-modules or other components of distinct functionality that can provide information to, or receive information from, other components. These modules can be used, for example, to communicate with input and output devices such as pointing devices, display screens and/or other user interface devices. For instance, certain embodiments include a user interface module that further comprises a display module configured to display a source image, a cursor module configured to display a movable cursor over the source image, a boundary detection module configured to detect a boundary in the source image, and a boundary smoothing module configured to smoothen the detected boundary.

For example, FIG. 1A schematically illustrates selected components of a computer system 100 that can be used to implement certain of the selection methodologies disclosed herein. The computer system 100 may comprise, for example, one or more devices selected from a desktop or laptop computer, a workstation, a tablet, a smartphone, a set-top box or any other such computing device. A combination of different devices may be used in certain embodiments. The computer system 100 of this example embodiment includes, among other things, a processor 110, a memory 120, a user interface module 140 and a communications module 150. As can be further seen, a bus and/or interconnect 160 is also provided to allow for intra-device communications using, for example, the communications module 150. Other componentry and functionality not reflected in the schematic block diagram of FIG. 1A will be apparent in light of this disclosure, and it will be appreciated that the claimed invention is not intended to be limited to any particular hardware configuration.

The processor 110 can be any suitable processor, and may include one or more coprocessors or controllers, such as a graphics processor, to assist in control of the computer system 100. The memory 120 can be implemented using any suitable type of digital storage, such as one or more of a disk drive, a universal serial bus (USB) drive, flash memory and/or random access memory. The communications module 150 can be any suitable network chip or chip set which allows for wired and/or wireless connection to a network so that the computer system 100 can communicate with other local and/or remote computing systems and/or servers. The network may be a local area network (for example, a home-based or office network) or a wide area network (for example, the Internet) or a combination of such networks, whether private or public or both. In some cases, access to computing resources on a given network may require credentials such as usernames and passwords, or any other suitable security mechanisms. Other embodiments of computer system 100 may not be coupled to any network and may just operate as a stand-alone computing system.

The user interface module 140 is configured to provide information to, and to receive information and commands from, a user; it can be implemented with or otherwise used in conjunction with a variety of suitable input/output devices such as a display, a touchscreen, a speaker, a keyboard, a mouse and/or a microphone. The user interface module 140 may be installed local to the computer system 100, as shown in the example embodiment of FIG. 1A. Alternatively, the computer system 100 may be implemented in a client-server arrangement wherein at least some portions of the user interface module 140 may be provided to client computing system 100 using an applet (for example, a JavaScript applet) or other downloadable module that can be provisioned in real-time in response to a request from the client computing system 100 for access to a given server having resources that are of interest to the user of the client computing system 100 (for example, a cloud-based repository of images and/or other content to be edited by the user). The server, if applicable, may be local to the network or remotely coupled to the network by one or more other networks and/or communication channels. In any such stand-alone or networked computing scenarios, the user interface module 140 may be implemented with any suitable technologies that allow a user to interact with the computing system.

Figure 1B:
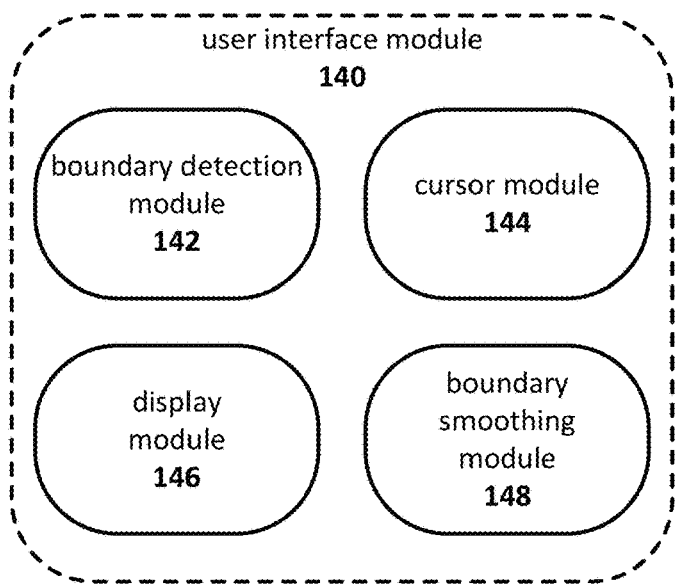
FIG. 1B is a block diagram schematically illustrating selected components of one embodiment of the user interface module that forms part of the computer system of FIG. 1A.

The user interface module 140 can be configured with the various selection editing techniques provided herein, so as to facilitate the process of selecting a targeted portion of a digital image using an image editing software application, in accordance with an embodiment of the present invention. As illustrated in FIG. 1B, this functionality can be implemented using, for example, sub-modules including a boundary detection module 142, a cursor module 144, a display module 146 and a boundary smoothing module 148. Other modules may additionally or alternatively be included in other embodiments. As will be appreciated, the image editing application may be local to the computer system 100 or served to the computer system 100 by an application server. In other embodiments, the selection editing techniques may be implemented in one or more dedicated modules with which the user interface module 140 interacts. These various selection editing techniques and sub-modules will be discussed in greater detail with reference to the example embodiments depicted in FIGS. 2-5D.

Figure 2:
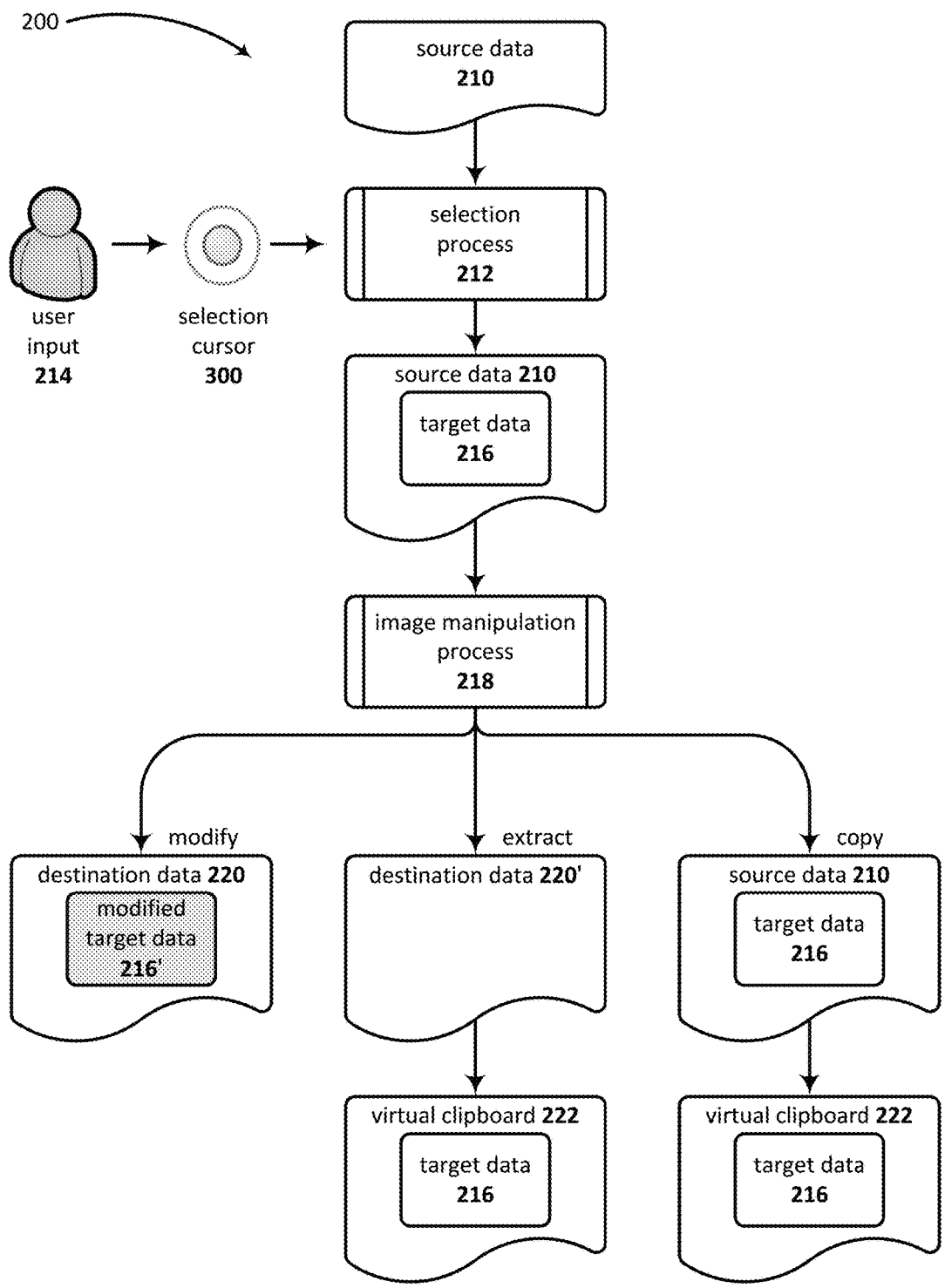
FIG. 2 is a flowchart illustrating example techniques for manipulating digital image data using a selection cursor that is configured in accordance with various embodiments of the present invention.

FIG. 2 is a flowchart illustrating example techniques 200 for manipulating digital image data using a selection cursor that is configured in accordance with various embodiments of the present invention. In such techniques, source data 210 is provided as input to a selection process 212. The source data 210 may be, for example a digital photograph of an elephant appearing before a stand of trees. The selection process 212, which in this example embodiment at least partially depends on user input 214 provided using selection cursor 300, defines a selection mask that identifies a subset of target data 216 within source data 210. For example, in the aforementioned photograph of the elephant, the target data 216 may comprise only that portion of the image which forms the elephant. An image manipulation process 218 can then be performed with respect to the source data 210, and more specifically, with respect to target data 216.

In one embodiment, the image manipulation process 218 results in the generation of destination data 220, in which the specific effects of the image manipulation process 218 are localized to modified target data 216'. Such specific effects may include, but are not limited to, a brightness adjustment, a contrast adjustment and/or color hue adjustment of the aforementioned elephant. In other embodiments, the image manipulation process 218 results in the generation of destination data 220', in which the target data 216 has been extracted to a virtual clipboard 222, from which it can be further processed, modified or distributed. In still other embodiments, the image manipulation process 218 leaves the source data 210 unaffected, but still copies the target data 216 to the virtual clipboard 222. It will be appreciated that the various effects of the image manipulation process disclosed herein can also be combined, for example such that the modified target data 216' can also be extracted or copied to the virtual clipboard 220. Additional details of the selection process 212 that yields the selection of target data 216 will be discussed with reference to FIGS. 3-5D.

B. Selection Cursor

Figure 3:
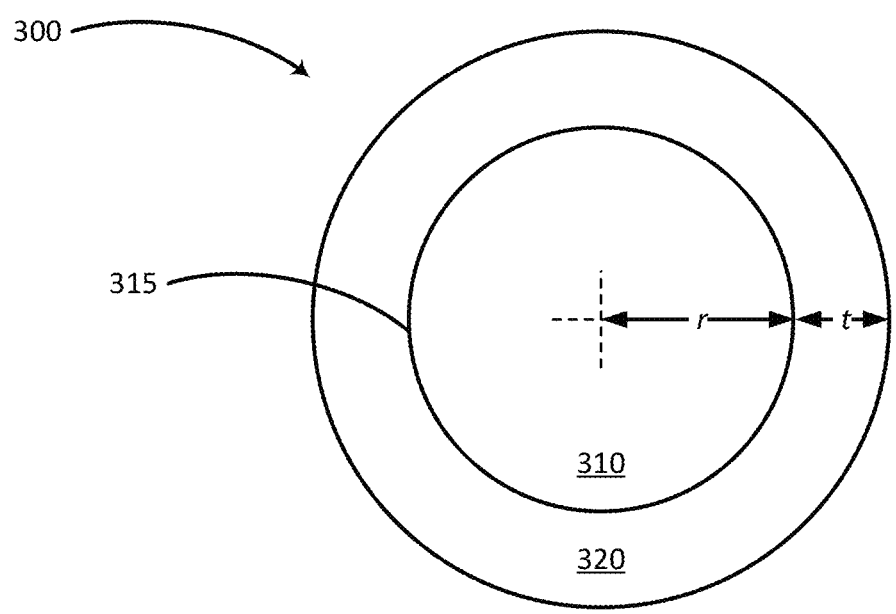
FIG. 3 is a schematic illustration of a selection cursor configured in accordance with an embodiment of the present invention.

Certain of the techniques disclosed herein, such as those illustrated in FIG. 2, use a selection cursor having different regions where different selection algorithms are applied. An example embodiment of such a selection cursor 300 is illustrated in FIG. 3. The example selection cursor 300 includes an interior region 310 having a radius r, and a peripheral region 320 having a thickness t that generally surrounds the interior region 310. The interior region 310 and peripheral region 320 meet at an interface 315. The interior region 310 is also referred to herein as the central region 310, even though the interior region need not be positioned in the center of the selection cursor 300. While the example selection cursor 300 has a circular configuration, it will be appreciated that selection cursors having other shapes and/or sizes can be used in other embodiments, and that the claimed invention is not intended to be limited to a particularly shaped or sized selection cursor. Thus, for example, in a another embodiment a wand-shaped selection cursor has an elongated central region surrounded by similarly-shaped elongated peripheral region. In other embodiments the central and peripheral regions have a different shape, and are optionally asymmetrical with respect to each other. In certain embodiments, the relative dimensions of the radius r of the central region 310 and the thickness t of the peripheral region 320 of the selection cursor 300 are user-configurable. Thus, for example, if a user wanted to use a selection cursor having a relatively larger central region and relatively smaller peripheral region, or vice-versa, the selection cursor could be configured according to such preference. However, in other embodiments the shape and dimensions of the selection cursor are not configurable, are hard coded, or are otherwise provisioned by default.

In some embodiments, the central region 310 of the selection cursor 300 can be used to define a region of the source image that is to be included within the selection region. In such embodiments, moving the central region 310 over a portion of the source image causes that portion of the source image to be included within the selection region. In this case, the selection cursor 300 can be referred to as having a positive polarity, or as being a "selecting", "growing" or "sourcing" selection cursor. However, in other embodiments the central region 310 of the selection cursor 300 can be used to define a region of the source image that is to be excluded from the selection region. In such embodiments, moving the central region 310 over a portion of the source image causes that portion of the source image to be excluded from the selection region. In this case, the selection cursor 300 can be referred to as having a negative polarity, or as being a "deselecting", "shrinking" or "sinking" selection cursor. The polarity of the selection cursor 300 can be controlled, for example, via a configuration setting accessed using a control menu, a configuration setting accessed using a control panel, or through the use of an alternate selection control such as an alternate mouse button. In certain embodiments the polarity of the selection cursor 300 can be indicated to the user by a different appearance of the selection cursor, such as a different color or texture scheme.

Unlike the central region 310, the peripheral region 320 of the selection cursor 300 defines an area where a localized level set algorithm for boundary detection is performed. Level set algorithms can be used to detect boundaries in digital images by representing the boundary as a zero-level set of a distance field. For example, the level set algorithm can be based on a function $\varphi(x, y, t)$ having its zero level set at the boundary that is to be detected; that is, $\varphi(x, y, t)=0$ where $(x, y) \in \Gamma(t)$. Differentiating this equation and extending it to the whole domain yields the level set advection equation $$\frac{\partial \varphi}{\partial t} + u \cdot \nabla \varphi = 0, \tag{1}$$

where u is a velocity that can be user-defined or otherwise pre-defined (for example, provisioned with a default or other appropriate value for a given application). Equation (1) represents a simple transport equation for the level set function $\varphi$. Thus the level set is a distance field wherein $\varphi=0$ at the boundary of the selection region, and $\varphi \neq 0$ inside and outside of the selection region. Use of level set algorithms in the context of boundary detection is further discussed in "Level Set Methods and Fast Marching Methods", by J. A. Sethian (1999).

Prior shape knowledge can be provided to the level set algorithm in the form of energy components that constrain the solution space of the distance field, in accordance with some embodiments. The user's movement of the selection cursor 300, and more specifically the peripheral region 320 of the selection cursor, can be used to provide this prior shape knowledge, thereby leading to more accurate boundary detection within the localized peripheral region 320. Level set algorithms can be computationally intensive when applied globally since the distance field should be reevaluated over the entire image with each adjustment of the boundary. Thus, limiting the application of a level set algorithm to the cursor peripheral region 320 reduces the computational burden to a point where near real-time feedback regarding the definition of the selection mask can be provided to the user. The accuracy with which the level set algorithm detects a boundary is optionally further enhanced through the use of an adaptive quad tree grid, which is an unstructured grid consisting of congruent but different-sized square cells that are automatically refined into smaller units around an interface. Adaptive quad tree grids are well suited for providing a high resolution approximation to a complex boundary geometry, and can enable the level set algorithm to operate at a resolution that is finer than the resolution of the underlying source image, in accordance with an embodiment. Use of an adaptive quad tree grid also advantageously conserves computational resources by reducing processing associated with portions of the source image not closely associated with the boundary, thus enabling the system to respond to the user's motion of the selection cursor faster. Other benefits will be apparent in light of this disclosure, such as reduced power consumption, which may be useful for portable variations of a given computing system 100.

Thus, in such embodiments, a boundary of the selection region falls within the cursor peripheral region 320. In the case of a selection cursor having positive polarity, the portion of the source image under the cursor central region 310 is selected and the boundary of the selection region is configured to expand outward toward the outer boundary of the peripheral region 320. The boundary will eventually reach or nearly reach the outer boundary of the peripheral region 320 if no intermediate boundary associated with the source image is detected. Alternatively, in the case of a selection cursor having a negative polarity, the portion of the source image under the cursor central region 310 is not selected and the boundary of the selection region is configured to shrink away from the cursor central region. The boundary will eventually reach or nearly reach the outer boundary of the peripheral region 320 if no intermediate boundary associated with the source image is detected. The sensitivity of the selection region boundary to boundaries detected within the source image can be governed by a coefficient k which is a function of the normalized distance d from the cursor central region 310. That is, d=0 at the interface 315 between the central region 310 and the peripheral region 320, and d=±1 at the outer edge of the peripheral region 320. In one embodiment, the coefficient k is defined by the fall-off function $$k(d) = \begin{cases} \frac{15}{16}(1-d^2) & \text{for } |d| \leq 1 \\ 0 & \text{for } |d| < 1 \end{cases} \quad (2)$$

although other fall-off functions can define the coefficient k, in accordance with other embodiments. The velocity at which the boundary of the selection region expands outward from or shrinks away from the central region 310 can be provided by $$\text{boundary velocity} = \frac{\nabla \varphi}{|\nabla \varphi|} \cdot s \cdot \vec{v}, \quad (3)$$

where s=+1 for a selection cursor with positive polarity, and s=−1 for a selection cursor with negative polarity. The velocity vector $\vec{v}$ is a unit vector corresponding to the direction normal to the boundary of the selection region.

Figure 4A:
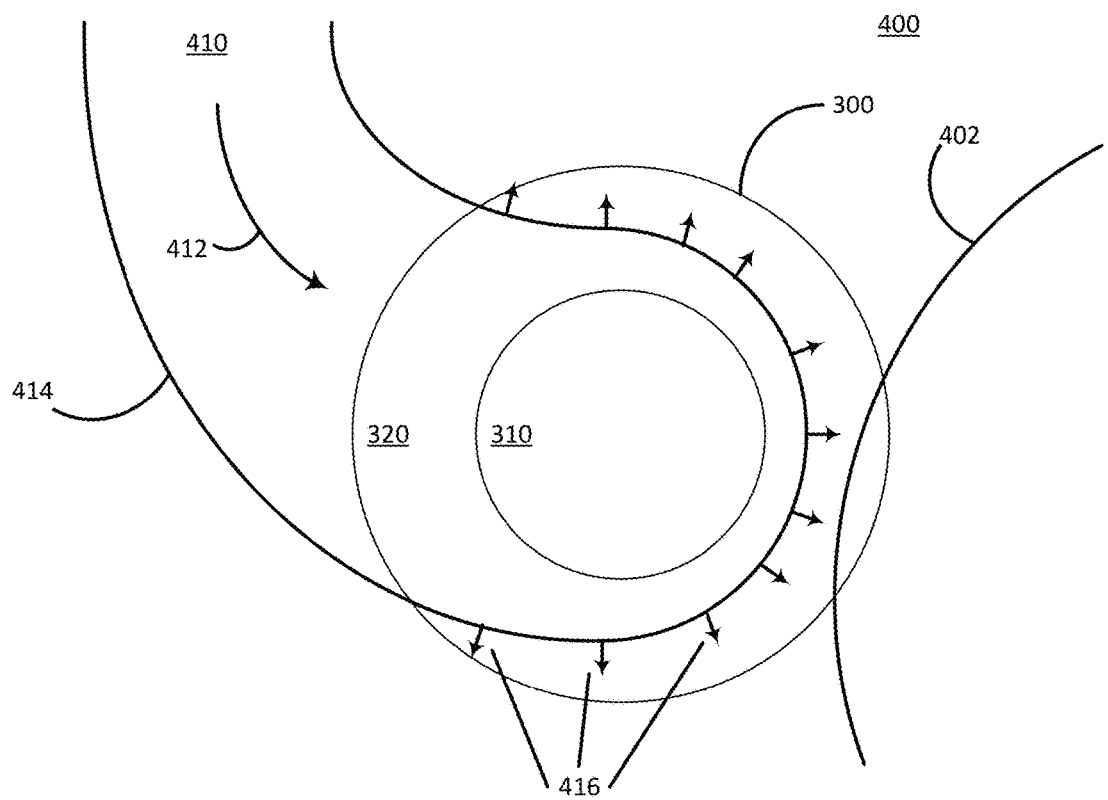
FIGS. 4A-4C schematically illustrate a first example methodology of defining a selection region using a selection cursor configured in accordance with an embodiment of the present invention.
Figure 4B:
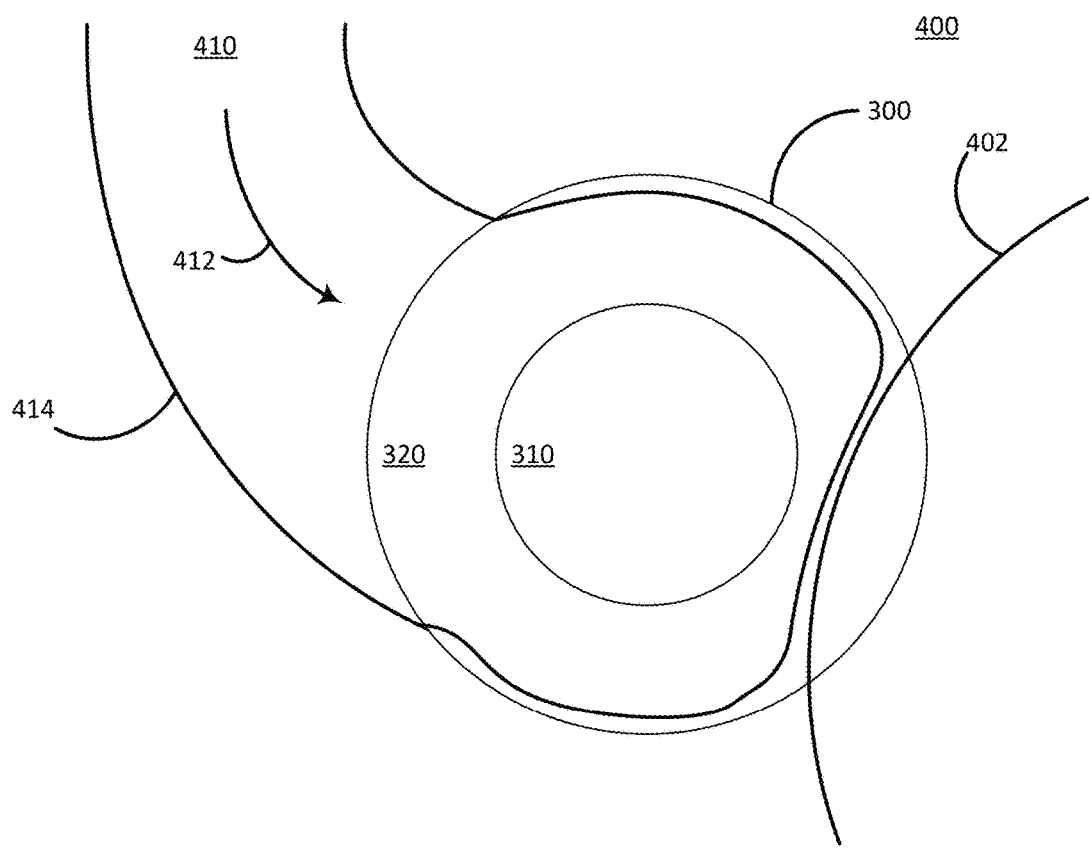
Figure 4C:
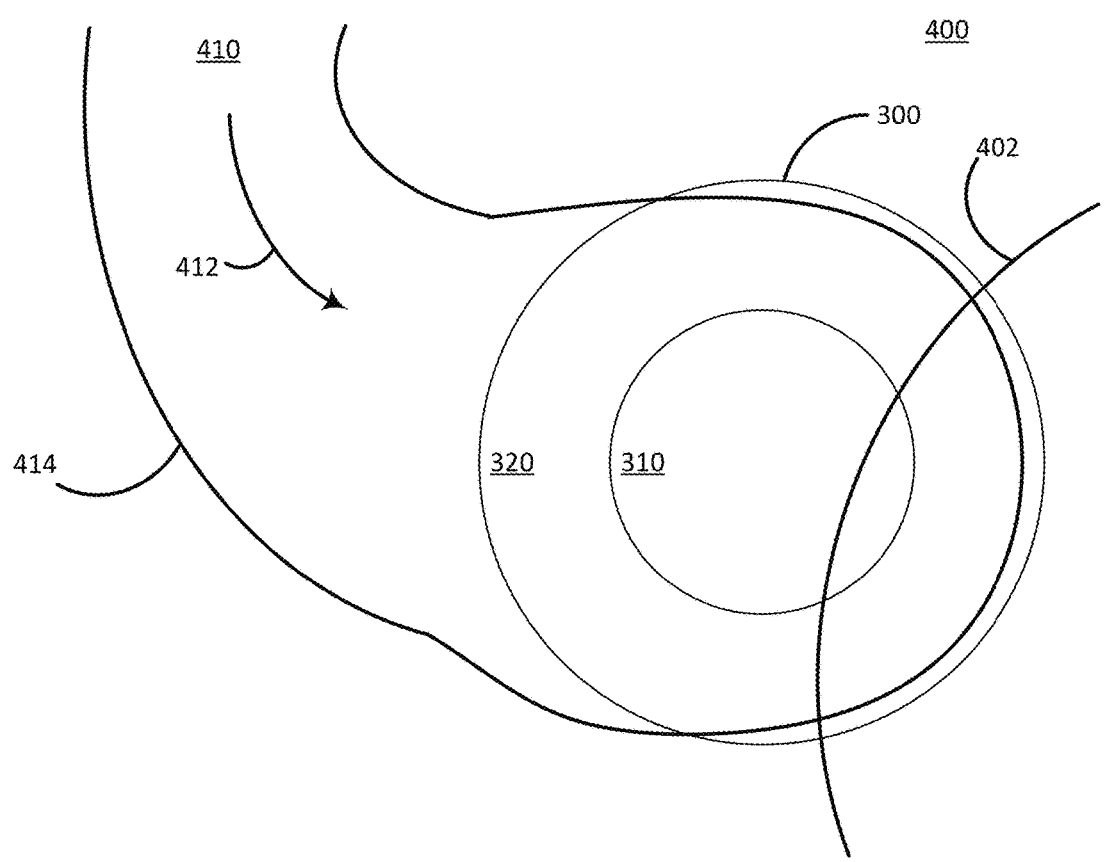

FIGS. 4A-4C illustrate an example methodology for defining a selection region 410 using a selection cursor 300 that is passed over a source image 400 in a direction indicated by arrow 412, in accordance with an embodiment of the present invention. This technique can be used to define a new selection region or to expand an existing selection region. In this example, the selection cursor 300 has a positive polarity. The source image 400 includes a boundary 402 that is to be detected. The selection region 410 is optionally indicated by a boundary line 414, which can be displayed to the user in real-time, or nearly in real-time, as the user moves the selection cursor 300 over the source image 400, in some embodiments. As explained previously, portions of the source image 400 over which the cursor central region 310 passes are included within the selection region 410. A level set algorithm is applied within the cursor peripheral region 320, thereby allowing boundary 402 to be detected. In general, the selection region 410 expands outward from the cursor central region 310 toward the outer edge of the cursor peripheral region 320, as indicated by arrows 416 in FIG. 4A. The arrows 416 correspond to the velocity vector $\vec{v}$ of Equation (3), above. However, where a boundary is detected within the peripheral region 320, such as boundary 402, the expansion of selection region 410 is modified such that selection region 410 substantially conforms to, and is constrained by, the detected boundary 402. Such modification is illustrated in FIG. 4B, which shows that the selection region 410 has expanded toward the outer edge of the cursor peripheral region 320, except where such expansion is constrained by boundary 402.

If the user wishes to expand the selection region 410 across the detected boundary 402, the user can simply move the cursor central region 310 across boundary 402. Because portions of the source image 400 over which the cursor central region 310 passes are included within the selection region 410 regardless of any boundaries detected in the source image 400, this will effectively expand the selection region 410 across the detected boundary 402, as is illustrated in FIG. 4C. In this example case, the level set algorithm continues to be applied within the cursor peripheral region 320 such that other boundaries that may exist beyond boundary 402 are detected.

Figure 4D:
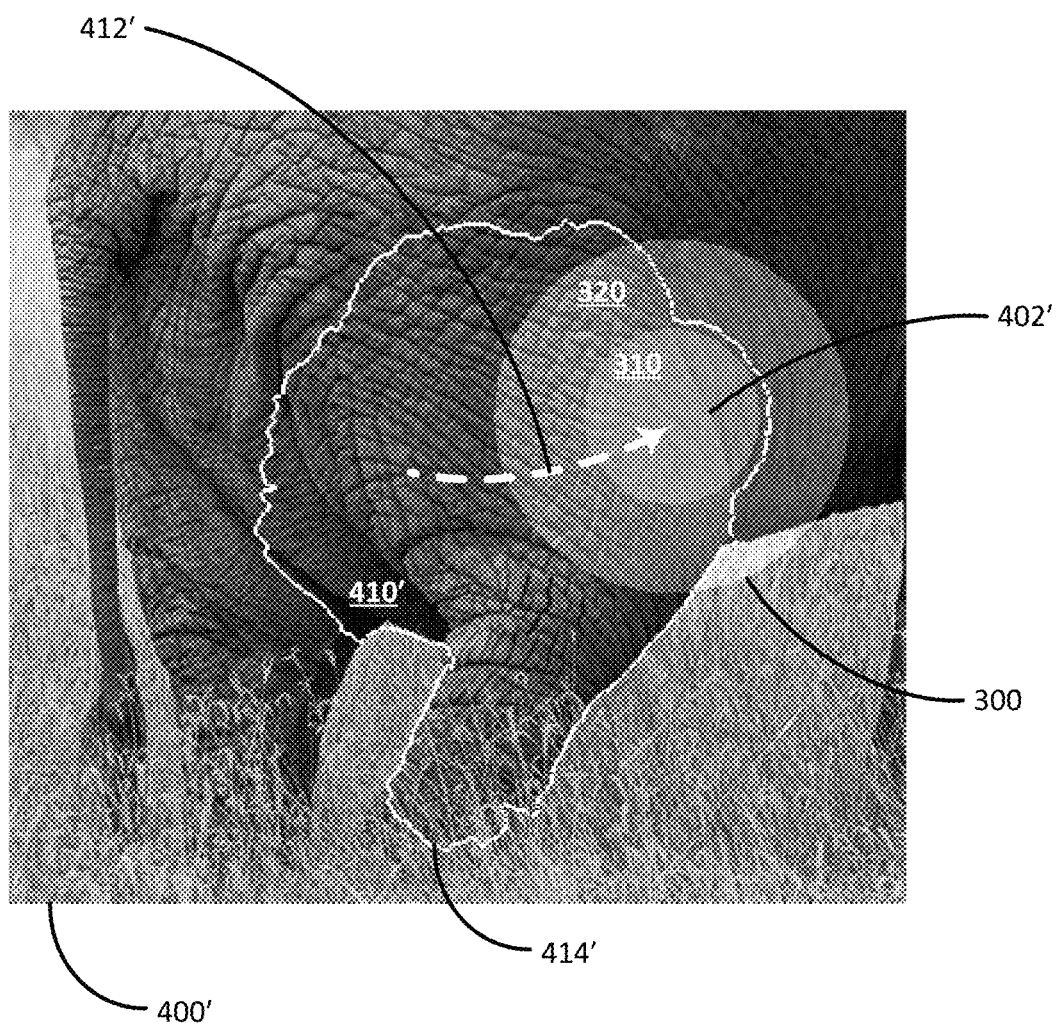
FIG. 4D is a photograph that illustrates how the first example methodology of FIGS. 4A-4C can be used to select an elephant from an image of an elephant standing in a field of grass.

FIG. 4D is a photograph that illustrates how the methodology that is illustrated schematically in FIGS. 4A-4C can be used to define a selection region from a source image. Specifically, FIG. 4D illustrates a source image 400' of an elephant standing in a field of grass. A selection cursor 300 is displayed over the source image 400', the selection cursor 300 including a central region 310 and a peripheral region 320 that are indicated by different colors. The selection cursor is moved over the elephant's body in a direction indicated by arrow 412', such that a selection region 410' is indicated by a boundary line 414'. The elephant's body includes a leg that appears to be positioned over the elephant's abdomen, resulting in a detected boundary 402'. Within the cursor peripheral region 302, this detected boundary determines the boundary line 414' defining the edge of selection region 410'. However, where the user has moved the cursor central region 310 across the detected boundary 402', the level set algorithm is applied to detect other boundaries that may exist beyond boundary 402'. This allows the user to easily indicate that the boundary 402' between the elephant's leg and abdomen is not the boundary which should define the selection region.

Figure 4E:
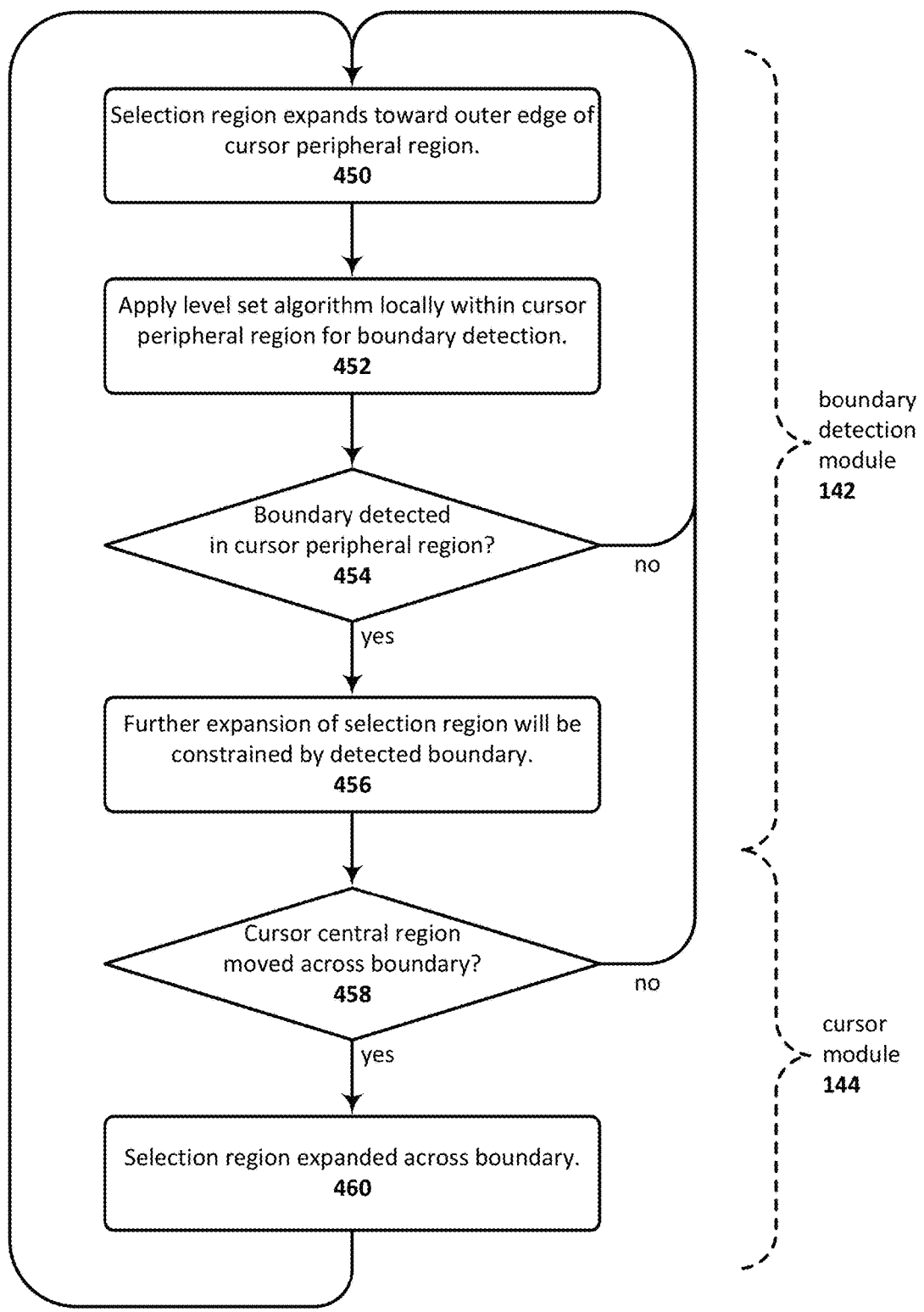
FIG. 4E is a flowchart illustrating an example technique for using a positive polarity selection cursor to define a selection region in accordance with an embodiment of the present invention.

FIG. 4E is a flowchart illustrating an example technique for using a positive polarity selection cursor to define a selection region, as shown in FIGS. 4A-4C as well as in the photograph provided in FIG. 4D, in accordance with an embodiment of the present invention. In this technique, the selection region generally expands 450 in a cursor peripheral region. A level set algorithm is applied 452 locally within the cursor peripheral region to detect 454 the presence of any boundaries. If no boundary is detected, the selection region continues to expand 450 toward the outer edge of the cursor peripheral region. However, if a boundary is detected, further expansion of the selection region is modified 456 such that the selection region substantially conforms to, and is constrained by, the detected boundary. The methodology can be carried out to this point using, for example, the boundary detection module 142 illustrated in FIG. 1B. However, if the cursor central region is moved 458 across the detected boundary, the selection region is expanded 460 across the boundary as well. This portion of the methodology operates independently of any detected boundaries, and thus can be carried out using, for example, the cursor module 144 illustrated in FIG. 1B. After the selection region is expanded across the boundary, the selection region continues to expand within the cursor peripheral region so that other boundaries that may exist can be detected.

FIGS. 5A-5C illustrate an example methodology for modifying an existing selection region 510 using a selection cursor 300 that is passed over a source image 500 in a direction indicated by arrow 512, in accordance with an embodiment of the present invention. In this example, the selection cursor 300 has a negative polarity. The source image 500 includes an internal boundary 502 within the existing selection region 510. The selection region 510 is optionally indicated by a boundary line 514, which can be displayed to the user in real-time, or nearly in real-time, as the user moves the selection cursor 300 over the source image 500, in some embodiments. As explained previously, portions of the source image 500 over which the cursor central region 310 passes are deselected and thus excluded from the selection region 510. A level set algorithm is applied within the cursor peripheral region 320, thereby allowing internal boundary 502 to be detected. In general, the selection region 510 shrinks away from the cursor central region 310 toward the outer edge of the cursor peripheral region 320, as indicated by arrows 516 in FIG. 5A. The arrows 516 correspond to the velocity vector $\vec{v}$ of Equation (3), above. However, where a boundary is detected within the peripheral region 320, such as internal boundary 502, the shrinking of selection region 510 is modified such that selection region 510 substantially conforms to, and is constrained by, the detected internal boundary 502. Such modification is illustrated in FIG. 5B, which shows that the selection region 510 has shrunk toward the outer edge of the cursor peripheral region 320, except where such shrinkage is constrained by internal boundary 502.

If the user wishes to further deselect areas within internal boundary 502, the user can simply move the cursor central region 310 across internal boundary 502. Because portions of the source image 500 over which the cursor central region 310 passes are excluded from the selection region 510 regardless of any boundaries detected in the source image 500, this will effectively trim the selection region 510 to a region within the internal boundary 502, as is illustrated in FIG. 5C. In this case the selection region 510 continues to shrink away from the cursor central region 310, as indicated by arrows 516 in FIG. 5C, and the level set algorithm continues to be applied inside the internal boundary 502 so that other internal boundaries that may exist within the selection region 510 can be detected.

FIG. 5D is a flowchart illustrating an example technique for using a negative polarity selection cursor to modify an existing selection region, as shown in FIGS. 5A-5C, in accordance with one embodiment of the present invention. In this technique, the selection region generally shrinks 550 away from a cursor central region. A level set algorithm is applied 552 locally within a cursor peripheral region to detect 554 the presence of any boundaries. If no boundary is detected, the selection region continues to shrink 550 away from the central cursor region. However, if a boundary is detected, further expansion of the selection region is modified 556 such that the selection region substantially conforms to, and is constrained by, the detected boundary. The methodology can be carried out to this point using, for example, the boundary detection module 142 illustrated in FIG. 1B. However, if the cursor central region is moved 558 across the detected boundary, the selection region is further trimmed 560 within the boundary as well. This portion of the methodology operates independently of any detected boundaries, and thus can be carried out using, for example, the cursor module 144 individual in FIG. 1B. After the selection region is trimmed across the boundary, the selection region continues to shrink within the cursor peripheral region so that other boundaries that may exist within the selection region can be detected.

For purposes of clarity, the idealized boundaries 402, 502 illustrated in FIGS. 4A-4C and 5A-5C are represented as clearly defined lines. However, it will be appreciated that the level set algorithm can be used to detect a wide variety of boundaries, including boundaries defined by graphical elements that comprise the source image, optionally including differences in color, texture, contrast, brightness and/or other graphical properties. Such complex boundaries might be used to select, for example, an animal's head separately from the body, or an animal's body separately from a background scene, such as illustrated in FIG. 4D. Applying a level set algorithm locally within the cursor peripheral region advantageously reduces computational resources, thereby facilitating the process of providing the user with real-time or nearly real-time feedback with respect to the shape of the selection region, even for very large and/or high resolution images. In addition, applying a level set algorithm in localized regions defined by the user's movement of the selection cursor provides important prior shape knowledge to the algorithm, thereby leading to more accurate boundary detection within the cursor peripheral region. Such prior shape knowledge is provided by the user's movement of the selection cursor, which effectively focuses the level set algorithm to a subset of the entire source image, thereby provided a smaller solution set for boundary determination. This localized approach reduces or eliminates problems that occur when a level set algorithm is applied across an entire image, such as failed detection of a boundary between regions with similar colors and/or textures.

One or more image processing techniques may be applied in conjunction with the localized application of the level set algorithm. Such image processing techniques can be used to modify the boundary of the selection region within the cursor peripheral region. For example, a snapping technique can be applied wherein the boundary of the selection region is snapped to a boundary detected within the cursor peripheral region. Boundary snapping can be accomplished, for example, by converting red-green-blue (RGB) color data associated with the source image to grayscale data using the luminescence equation $$l=0.299r+0.587g+0.114b, \qquad (4)$$

wherein l is a greyscale luminescence of a selected pixel, and r, g and b are red, green and blue color coefficients associated with the selected pixel, respectively. In this case, the gradient ∇l can be used to determine a snapping direction to the boundary edge, and the snapping velocity is provided by $$\text{snapping velocity} = \frac{\nabla|\nabla l|}{|\nabla||\nabla l|} \cdot |\nabla l| \cdot \varepsilon, \qquad (5)$$

where ε is a snap force coefficient. Thus where the color gradient ∇l is strong the snapping velocity is higher, and where the color gradient ∇l is weak the snapping velocity is lower. Other snapping algorithms can be used in other embodiments. Additionally or alternatively, a smoothing or curvature control technique can be applied wherein rough edges of the selection region are smoothened within the cursor peripheral region. Other image processing techniques can be applied in other embodiments, and it will be recognized that the claimed invention is not intended to be limited to application of any particular image processing technique or techniques within the cursor peripheral region.

C. Conclusion

Numerous variations and configurations will be apparent in light of this disclosure. For instance, one example embodiment provides a method for defining a selection mask associated with a source image. The method comprises displaying a selection cursor over the source image. The selection cursor has an interior region and a peripheral region. The method further comprises locating an initial position of a selection mask boundary in a portion of the source image that is overlaid by the peripheral region of the selection cursor. The initial position of the selection mask boundary is at least partially based on a boundary that is detected as a result of selectively applying a boundary detection algorithm to a sub-region of the source image. In some cases, the method further comprises expanding the selection mask boundary so as to expand the selection region within the peripheral region of the selection cursor, wherein the expansion is constrained by the boundary that is detected as a result of applying the boundary detection algorithm. In some cases the method further comprises contracting the selection mask boundary so as to shrink the selection region within the peripheral region of the selection cursor, wherein the contraction is constrained by the boundary that is detected as a result of applying the boundary detection algorithm. In some cases the method further comprises snapping the selection mask boundary to the boundary that is detected as a result of applying the boundary detection algorithm. In some cases (a) the selection cursor has a positive polarity mode and a negative polarity mode; (b) the interior region of the selection cursor defines a region within the selection mask when the selection cursor is in the positive polarity mode; and (c) the interior region of the selection cursor defines a region outside the selection mask when the selection cursor is in the negative polarity mode. In some cases, (a) the selection cursor includes a positive polarity mode in which the interior region of the selection cursor defines a region within the selection mask; (b) the selection cursor includes a negative polarity mode in which the interior region of the selection cursor defines a region outside the selection mask; and (c) the positive and negative polarity modes are selected using a control provided on a user interface device. In some cases the boundary detection algorithm is applied to that sub-region of the source image that is overlaid by the peripheral region of the selection cursor. In some cases the boundary detection algorithm is a level set algorithm. In some cases the boundary detection algorithm is a level set algorithm applied using an adaptive quad tree grid. In some cases the method further comprises moving the selection mask boundary to a modified position in response to the interior region of the selection cursor passing over the initial position of the selection mask boundary.

Another example embodiment of the present invention provides an image segmentation system. The image segmentation system comprises a user interface module configured to overlay on a displayed source image a selection cursor having an interior region and a peripheral region. The image segmentation system further comprises an boundary detection module configured to detect a boundary within a region of the source image that is overlaid by the peripheral region. The boundary is detected by applying a level set algorithm to a portion of the source image. In some cases (a) the selection cursor includes a positive polarity mode in which the interior region of the selection cursor defines a region within a selection region that corresponds to the boundary detected by the boundary detection module; and (b) the selection cursor includes a negative polarity mode in which the interior region of the selection cursor defines a region outside a selection region that corresponds to the boundary detected by the boundary detection module. In some cases the level set algorithm is applied to that portion of the source image that is overlaid by the peripheral region. In some cases the image segmentation system further comprises a display module configured to display an edge boundary of a selection region that corresponds to the boundary detected by the boundary detection module. In some cases the image segmentation system further comprises a boundary smoothing module configured to smoothen the detected boundary. In some cases the edge is detected by applying a level set algorithm using an adaptive quad tree grid.

Another example embodiment of the present invention provides a non-transient computer readable medium having instructions encoded thereon that, when executed by one or more processors, causes an image segmentation process to be carried out. The image segmentation process comprises displaying a selection cursor over the source image, the selection cursor having an interior region and a peripheral region. The image segmentation process further comprises setting an initial position of a selection mask boundary in a portion of the source image that is overlaid by the peripheral region of the selection cursor. The initial position of the selection mask boundary is at least partially based on a boundary that is detected as a result of selectively applying a boundary detection algorithm to a sub-region of the source image. In some cases (a) the selection cursor includes a positive polarity mode in which the interior region of the selection cursor defines a region within the selection mask; and (b) the selection cursor includes a negative polarity mode in which the interior region of the selection cursor defines a region outside the selection mask. In some cases the boundary detection algorithm is a level set algorithm applied using an adaptive quad tree grid. In some cases the image segmentation process further comprises moving the selection mask boundary to a modified position in response to the interior region of the selection cursor passing over the initial position of the selection mask boundary.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A method for defining a selection region in a source image, the method comprising:
    displaying, on a display device, a selection cursor over the source image, the selection cursor having an interior region and a peripheral region; and
    locating an initial position of a selection mask boundary in a portion of the source image that is overlaid by the peripheral region of the selection cursor,
    wherein the initial position of the selection mask boundary is at least partially based on a boundary that is detected as a result of selectively applying a boundary detection algorithm to the portion of the source image that is overlaid by the peripheral region of the selection cursor, and
    wherein the boundary detection algorithm is not applied in a portion of the source image that is overlaid by the interior region of the selection cursor.

2. The method of claim 1, further comprising, responsive to user input that causes the selection cursor to move, repositioning the selection mask boundary within a portion of the source image that is overlaid by a modified location of the peripheral region of the selection cursor.

3. The method of claim 1, wherein the selection cursor is movable in response to user input.

4. The method of claim 1, wherein, responsive to user input, the entire selection cursor can be translated from a first position in the source image to a second position in the source image.

5. The method of claim 1, wherein:
    the interior region of the selection cursor defines the selection region when the selection cursor is in a positive polarity mode; and
    the interior region of the selection cursor defines a deselected region when the selection cursor is in a negative polarity mode.

6. The method of claim 1, wherein, once the selection cursor is displayed on the display device, a shape of the selection cursor is not user-configurable.

7. The method of claim 1, further comprising:
    responsive to user input, moving the selection cursor from a first region of the source image to a second region of the source image; and
    as the selection cursor moves in response to the user input, relocating the initial position of the selection mask boundary such that it remains within the portion of the source image that is overlaid by the peripheral region of the selection cursor.

8. An image segmentation system that includes a memory device and a processor that is operatively coupled to the memory device, wherein the processor is configured to execute instructions stored in the memory device that, when executed, cause the processor to carry out an image segmentation process, the process comprising:
    overlaying, on a displayed source image, a selection cursor having an interior region and a peripheral region; and
    detecting a boundary within a first region of the displayed source image that is overlaid by the peripheral region of the cursor, wherein the boundary is detected by applying a level set algorithm to the first region of the displayed source image, and wherein the level set algorithm is not applied to a second region of the displayed source image that is overlaid by the interior region of the selection cursor.

9. The image segmentation system of claim 8, wherein the image segmentation process further comprises, responsive to user input that causes the selection cursor to move, repositioning the boundary within a modified first region of the displayed source image that is overlaid by the peripheral region of the selection cursor.

10. The image segmentation system of claim 8, wherein:
    the interior region of the selection cursor defines a selected region when the selection cursor is in a positive polarity mode; and
    the interior region of the selection cursor defines a deselected region when the selection cursor is in a negative polarity mode.

11. The image segmentation system of claim 8, wherein the image segmentation process further comprises:
    responsive to user input, moving the selection cursor from a first location in the displayed source image to a second location in the displayed source image; and
    as the selection cursor moves in response to the user input, relocating the detected boundary such that it is within a modified first region of the displayed source image that is overlaid by the peripheral region of the cursor.

12. The image segmentation system of claim 8, wherein the selection cursor is movable in response to user input.

13. The image segmentation system of claim 8, wherein, once the selection cursor is overlaid on the displayed source image, a shape of the selection cursor is not user-configurable.

14. The image segmentation system of claim 8, wherein, responsive to user input, the selection cursor is translatable from a first location in the displayed source image to a second location in the displayed source image.

15. A non-transitory computer readable medium having instructions encoded thereon that, when executed by one or more processors, causes an image segmentation process to be carried out, the process comprising:
    displaying, on a display device, a selection cursor over a source image, the selection cursor having an interior region and a peripheral region; and
    locating an initial position of a selection mask boundary in a portion of the source image that is overlaid by the peripheral region of the selection cursor,
    wherein the initial position of the selection mask boundary is at least partially based on a boundary that is detected as a result of selectively applying a boundary detection algorithm to a first sub-region of the source image, and
    wherein the boundary detection algorithm is not applied to a second sub-region of the source image that is overlaid by the interior region of the selection cursor.

16. The non-transitory computer readable medium of claim 15, wherein:
    the interior region of the selection cursor defines a selected region when the selection cursor is in a positive polarity mode; and
    the interior region of the selection cursor defines a deselected region when the selection cursor is in a negative polarity mode.

17. The non-transitory computer readable medium of claim 15, wherein the image segmentation process further comprises, responsive to user input that causes the selection cursor to move, repositioning the selection mask boundary within a modified first sub-region of the source image.

18. The non-transitory computer readable medium of claim 15, wherein, once the selection cursor is displayed on the display device, a shape of the selection cursor is not user-configurable.

19. The non-transitory computer readable medium of claim 15, wherein the image segmentation process further comprises:
    responsive to user input, moving the selection cursor from a first location in the source image to a second location in the source image; and
    as the selection cursor moves in response to the user input, relocating the selection mask boundary from the initial position to a modified position, wherein the modified position is within a region of the source image that is overlaid by a modified location of the peripheral region of the selection cursor.

20. The non-transitory computer readable medium of claim 15, wherein the entire selection cursor is uniformly movable in response to user input.

\* \* \* \* \*